(12) United States Patent
Stephenson et al.

(10) Patent No.: US 8,200,406 B2
(45) Date of Patent: Jun. 12, 2012

(54) REDUCING BRAKE NOISE DURING LOW PRESSURE BRAKING

(75) Inventors: Arthur Stephenson, Southfield, MI (US); Jingsheng Yu, Northville, MI (US); Shawn Berry, Northville, MI (US); Ed Schultz, Sterling Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 12/534,479

(22) Filed: Aug. 3, 2009

(65) Prior Publication Data

US 2011/0029211 A1    Feb. 3, 2011

(51) Int. Cl.
*B60T 8/00* (2006.01)

(52) U.S. Cl. ........ 701/70; 701/78; 303/3; 303/138; 303/155; 303/166; 303/191; 188/1.11 R; 188/1.11 E; 188/354

(58) Field of Classification Search ........ 701/70, 701/71, 78, 83; 303/3, 11, 125, 138, 155, 303/157, 160, 166, 191, 112, DIG. 1, DIG. 2; 188/1.11 R, 1.11 E, 151 R, 354
See application file for complete search history.

(56) References Cited

U.S. PATENT DOCUMENTS

| | | | |
|---|---|---|---|
| 3,929,380 A | 12/1975 | Leiber | |
| 4,743,074 A | 5/1988 | Inoue | |
| 4,824,184 A * | 4/1989 | Spadafora et al. | 303/157 |
| 5,108,159 A | 4/1992 | Tsang et al. | |
| 5,967,627 A | 10/1999 | Hosoya et al. | |
| 6,095,620 A * | 8/2000 | Dillard et al. | 303/11 |
| 6,421,598 B1 * | 7/2002 | Oshiro | 701/71 |
| 6,898,976 B2 | 5/2005 | Kamiya et al. | |
| 6,923,513 B2 | 8/2005 | Kamiya et al. | |
| 6,957,875 B2 | 10/2005 | Kamiya et al. | |

(Continued)

FOREIGN PATENT DOCUMENTS

| | | |
|---|---|---|
| DE | 19804676 | 8/1999 |
| KR | 20030009605 | 2/2003 |

OTHER PUBLICATIONS

Bosch Automotive Handbook, 5th Edition, 2000.

(Continued)

*Primary Examiner* — Thomas Black
*Assistant Examiner* — Ce Li
(74) *Attorney, Agent, or Firm* — Michael Best & Friedrich LLP (57) ABSTRACT

A mechanism for reducing brake noise during braking of a vehicle. The mechanism includes controllers and methods that "hold" a currently applied braking torque rather than applying the operator-requested braking torque when a vehicle is traveling at a low speed and the operator-requested braking torque is within a predetermined range. The controllers and methods "release" the previously "held" braking torque and apply the operator-requested braking torque once the operator-requested braking torque is outside the predetermined range.

19 Claims, 5 Drawing Sheets

U.S. PATENT DOCUMENTS

| | | | |
|---|---|---|---|
| 2001/0028195 A1* | 10/2001 | Yu | 303/155 |
| 2002/0026272 A1* | 2/2002 | Yamamoto | 701/70 |
| 2004/0174067 A1* | 9/2004 | Kamiya et al. | 303/191 |
| 2004/0178675 A1* | 9/2004 | Kamiya et al. | 303/191 |
| 2004/0183366 A1 | 9/2004 | Kamiya et al. | |
| 2004/0187581 A1* | 9/2004 | Kamiya et al. | 73/593 |
| 2004/0206589 A1 | 10/2004 | Kamiya et al. | |
| 2004/0212246 A1 | 10/2004 | Kamiya et al. | |
| 2006/0202555 A1* | 9/2006 | Kingston et al. | 303/191 |
| 2007/0210641 A1* | 9/2007 | Itoh et al. | 303/11 |
| 2007/0216224 A1* | 9/2007 | Schmitt et al. | 303/191 |
| 2008/0103668 A1* | 5/2008 | Kamikado | 701/70 |
| 2008/0179944 A1 | 7/2008 | Spaeth | |

OTHER PUBLICATIONS

Toon, John, "Stopping the Noise—Active Control System Could Halt Squealing Brakes in Cars, Trucks, and Buses", Research Horizons, pp. 29-30, 2003.

Vadari, Vish, et al., "An Introduction to Brake Noise Engineering", Sound & Vibration—Materials Reference Issue, pp. 14-20, Jul. 2001.

Seiichi, Ishizeki, et al., "Noise Reduction Method in Hydraulic Control on Brake Systems", Subaru Technical Review, No. 26, English Abstract, abstract available online at: <http://sciencelinks.jp/j-east/article/199920/000019992099A0600346.php>, 1999.

* cited by examiner

REDUCING BRAKE NOISE DURING LOW PRESSURE BRAKING

BACKGROUND

The present invention relates to reducing brake noise during braking of a vehicle. More particularly, embodiments of the invention relate to reducing brake noise in low-speed braking situations.

SUMMARY

During braking of a vehicle, components of a brake may make audible noises due to friction between the components. This is especially true when the vehicle is traveling at low speeds and the vehicle operator applies "light" brake pressure. Although reducing or eliminating this noise is advantageous, specially-designed systems and controllers are costly and complex. In addition, some methods and systems for reducing brake noise actually create additional audible noises.

Embodiments of the invention provide a mechanism for reducing brake noise that "holds" a currently applied braking torque rather than applying the operator-requested braking torque when a vehicle is traveling at a low speed and the operator-requested braking torque is within a predetermined range. The mechanism "releases" the previously "held" braking torque and applies the operator-requested braking torque once the operator-requested braking torque is outside the predetermined range.

In one embodiment, the invention provides a method for reducing brake noise in a vehicle. The method is executed by a brake control system, which includes an electronic control unit and an actuator that controls a brake assembly that applies a braking torque to a wheel of the vehicle. The method includes determining if a current velocity of the vehicle is less than a velocity threshold, determining if a requested braking torque is between a first torque threshold and a second torque threshold, and determining if the current braking torque applied to the wheel by the brake assembly is changing.

The method also includes determining a current braking torque applied to the wheel by the brake assembly and outputting a first signal to the actuator instructing it to control the brake assembly to continue to apply the current braking torque to the wheel if (1) the current velocity of the vehicle is less than the velocity threshold, (2) the requested braking torque is between the first torque threshold and the second torque threshold, and (3) the current braking torque applied to the wheel by the brake assembly is changing.

In addition, the method includes outputting a second signal to the actuator instructing the actuator to control the brake assembly to apply the requested braking torque to the wheel if (1) the current velocity of the vehicle is less than the velocity threshold, (2) the requested braking torque is not between the first torque threshold and the second torque threshold, and (3) the current braking torque applied to the wheel by the brake assembly is not changing.

Another embodiment of the invention provides an electronic control unit for reducing brake noise in a vehicle. The electronic control unit includes an electronic processing unit and a brake noise reduction module, which is executed by the electronic processing unit. The brake noise reduction module determines if a current velocity of the vehicle is less than a velocity threshold, determines if a requested braking torque is between a first torque threshold and a second torque threshold, and determines if current braking torque applied to a wheel by a brake assembly is changing.

The brake noise reduction module also determines a current braking torque applied to the wheel by the brake assembly and outputs a first signal to an actuator instructing the actuator to control the brake to continue to apply the current braking torque to the wheel if (1) the current velocity of the vehicle is less than the velocity threshold, (2) the requested braking torque is between the first torque threshold and the second torque threshold, and (3) the braking torque applied to the wheel by the brake assembly is changing.

The brake noise reduction module will control the brakes based on the requested torque as opposed to holding the torque under the conditions already mentioned. In particular, the brake noise reduction module outputs a second signal to the actuator instructing the actuator to control the brake assembly to apply the requested braking torque to the wheel if (1) the current velocity of the vehicle is less than the velocity threshold, (2) the requested braking torque is not between the first torque threshold and the second torque threshold, and (3) the braking torque applied to the wheel by the brake assembly is not changing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be utilized to implement the invention. As described in subsequent paragraphs, the specific configurations illustrated in the drawings are intended to exemplify embodiments of the invention and other alternative configurations are possible.

Figure 1:
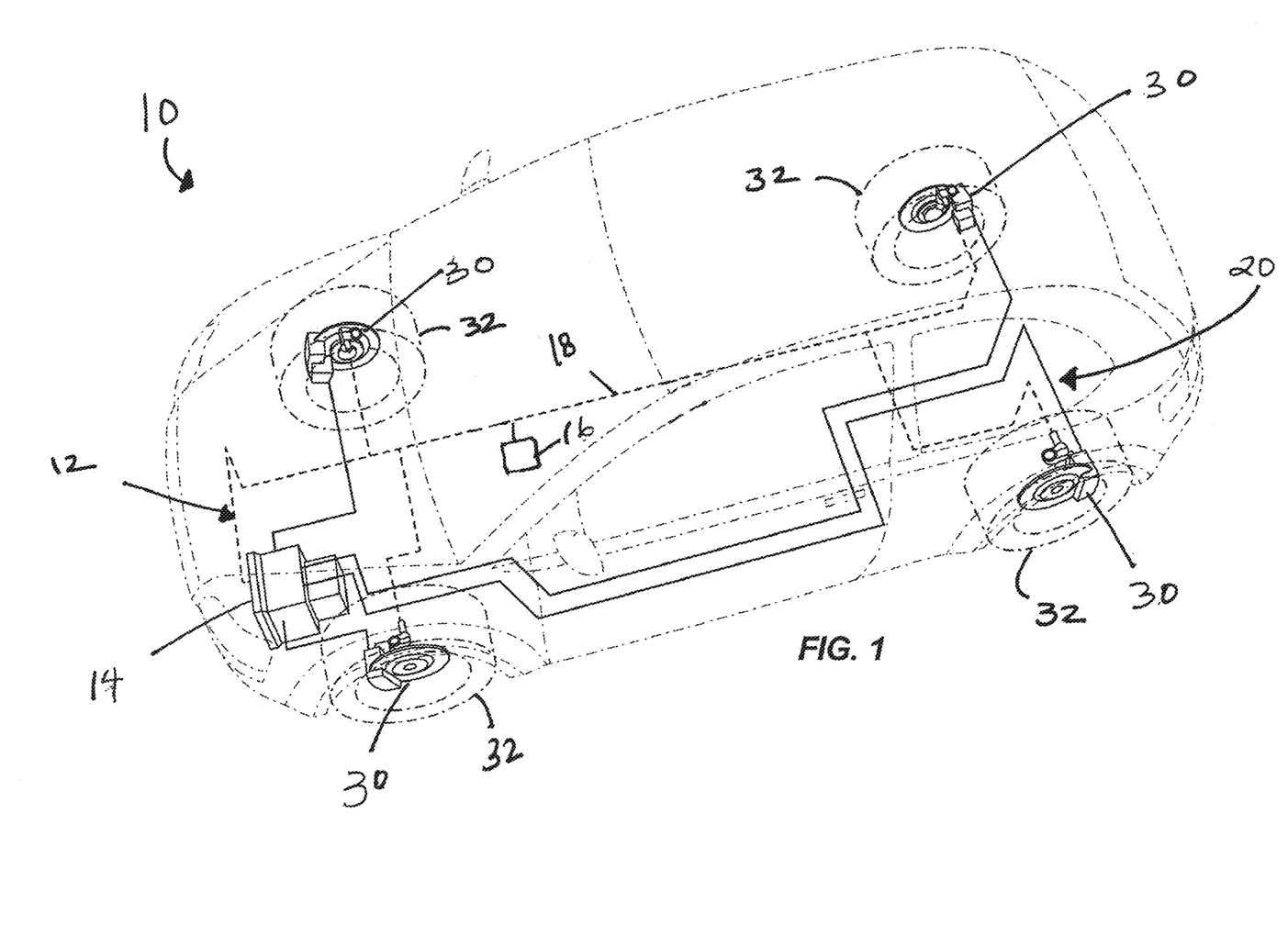
FIG. 1 is a perspective view of a vehicle including an electronic control unit for reducing brake noise according to embodiments of the invention.

FIG. 1 illustrates a vehicle 10 including a system 12 for reducing brake noise according to one embodiment of the invention. As shown in FIG. 1, the system 12 includes an electronic control unit ("ECU") 14 and a pressure sensor 16. The pressure sensor 16 is associated with a master cylinder of a hydraulic brake system included in the vehicle 10 and senses the amount of pressure in the brake system. The amount of pressure in the brake system is dependent upon actuation of a brake pedal by a vehicle operator, in the sense that lightly "tapping" or applying the brake pedal causes relatively little pressure to be applied to the brakes, whereas "stomping" on the pedal cause a relatively large amount of pressure to be applied to the brakes. As shown in FIG. 1, information output by the pressure sensor 16 is transmitted to the ECU 14.

Figure 2:
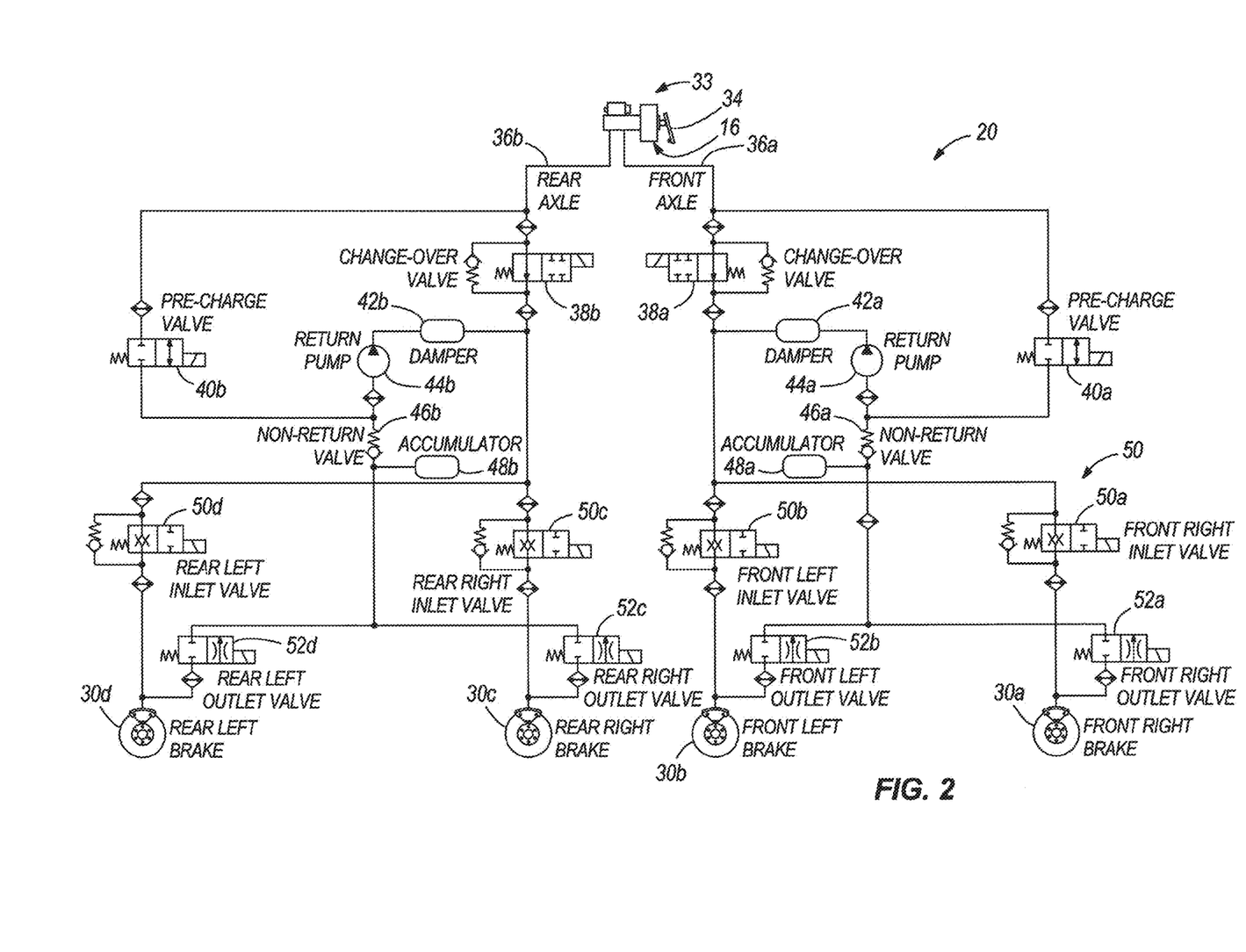
FIG. 2 schematically illustrates a hydraulic brake system according to one embodiment of the invention.

The vehicle 10 also includes a brake system 20, which includes a brake assembly 30 associated with each wheel 32. In some embodiments, the brake system 20 is a hydraulic brake system, as schematically illustrated in FIG. 2. As shown in FIG. 2, the hydraulic brake system 20 includes a master cylinder 33, which is connected to a brake pedal 34. As described above, the pressure sensor 16 is associated with the master cylinder 33 and senses a requested braking torque or pressure based on the vehicle operator's actuation of the brake pedal 34.

The hydraulic brake system 20 also includes a front axle 36a ("VA"), a rear axle 36b ("HA"), two change-over valves 38a and 38b ("USV1" and "USV2"), two pre-charge valves 40a and 40b ("VLV1" and "VLV2"), two dampers 42a and 42b ("D1" and "D2"), two return pumps 44a and 44b ("RFP"), and two non-return valves 46a and 46b ("RVR1" and "RVR2"), two accumulators 48a and 48b ("S1" and "S2"). The hydraulic brake system 20 also includes an inlet valve 50 ("EV") associated with each wheel 32. Therefore, the system 20 also includes a front right inlet valve 50a ("EVVR"), a front left inlet valve 50b ("EVVL"), a front rear inlet valve 50c ("EVHR"), and a rear left inlet valve 50d ("EVHL"). Each inlet valve 50 is also associated with an outlet valve ("AV") 52 and a brake assembly 30. Therefore, the system 20 includes a front right outlet valve 52a ("AVVR") and a front right brake assembly 30a ("VR"), a front left outlet valve 52b ("AVVL") and a left front brake assembly 30b ("VL"), a rear right outlet valve 52c ("AVHR") and a rear right brake assembly 30c ("HR"), and a rear left outlet valve 52d ("AVHL") and a rear left brake assembly 30d ("HL").

An actuator is associated with the valves included in the hydraulic brake system 20 and controls the opening and closing of the valves, which controls the amount of braking torque or pressure applied to a wheel 32 by a corresponding braking assembly 30. As described below, an actuator receives a signal from the ECU 14 instructing it to control the valve in order to apply a certain amount of braking torque to a wheel 32.

The hydraulic brake system 20 illustrated in FIG. 2 is only one example of a brake system to which the brake-noise-reduction methods (discussed below with respect to FIGS. 4 and 5) can be applied. The brake-noise-reduction methods can be applied to other types of brake systems, such as electromechanical brake systems. If the vehicle 10 includes an electromechanical brake system, actuators included in the system control an electric motor associated with a brake assembly rather than a valve. However, the actuator receives a similar signal from the ECU 14 instructing it to control the motor in order to apply a certain amount of braking torque to a wheel 32.

Figure 3:
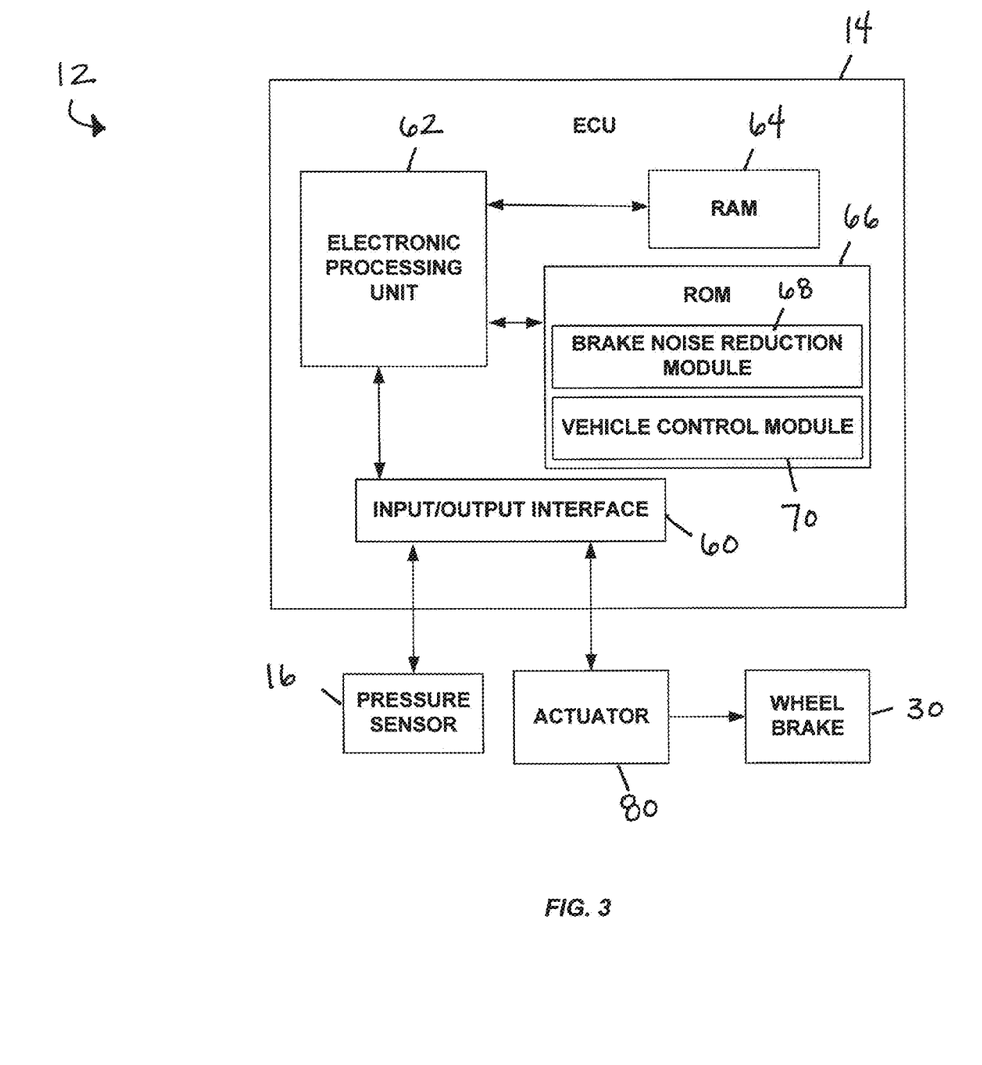
FIG. 3 schematically illustrates the electronic control unit of FIG. 1 according to one embodiment of the invention.

FIG. 3 schematically illustrates the system 12 of FIG. 1 in greater detail. As shown in FIG. 3, the system 12 includes the ECU 14 and the pressure sensor 16. The ECU 14 includes an input/output interface 60, an electronic processing unit ("EPU") 62, and one or more memory modules, such as a random access memory ("RAM") 64 and read-only memory ("ROM") 66. The input/output interface 60 transmits and/or receives information, including sensor readings from the pressure sensor 16.

The EPU 62 obtains the received sensor readings and processes the information by executing one or more applications or modules. The applications or modules are stored in the ROM 66. As shown in FIG. 3, the EPU 62 executes a brake noise reduction ("BNR") module 68 and a vehicle control module 70. The BNR module 68 provides brake noise reduction functionality and the vehicle control module 70 provides vehicle control functionality, such as electronic stability control ("ESC") functionality or anti-lock braking system ("ABS") functionality. By having the EPU 62 execute both the BNR module 68 and the vehicle control module 70, the hardware and software needed to provide brake noise reduction is reduced as compared to providing a separate brake noise reduction controller with a separate EPU and associated hardware and software. In particular, to provide ABS or ESC functionality, the ECU 14 requires software and hardware for interacting with the pressure sensor 16 and controlling the hydraulic brake system 20. The ECU 14, however, can use the same or similar software and hardware to perform brake noise reduction functionality, which also requires interaction with the pressure sensor 16 and control of the hydraulic brake system 20. In this respect, the BNR module 68 can configured as an "add-on" feature for an ESC or ABS system or controller.

As shown in FIG. 3, the ECU 14 outputs signals to an actuator 80. The signals sent to the actuator 80 can relate to ABS functionality or ESC functionality (e.g., when the EPU 62 is executing the vehicle control module 70) or BNR functionality (e.g., when the EPU 62 is executing the BNR module 68). In some embodiments, the ECU 14 outputs a pulse-width-modulated ("PWM") signal to the actuator 80. Although only one actuator 80 is illustrated in FIG. 3, the ECU 14 is configured to output signals to multiple actuators 80, such as an actuator 80 associated with each wheel 32.

As described above, in a hydraulic brake system, the signal output by the ECU 14 instructs the actuator 80 to control or adjust a valve, such as an inlet valve 50, to apply a particular braking torque to a wheel 32 via a brake assembly 30. Similarly, in an electro-mechanical brake system, an actuator 80 is associated with an electric motor that controls the braking torque applied to a particular wheel 32. The signal output by the ECU 14 instructs the actuator 80 to control or adjust the output of an electric motor that controls the brake assembly 30, and, consequently, controls the braking torque applied to the wheel 32.

Figure 4:
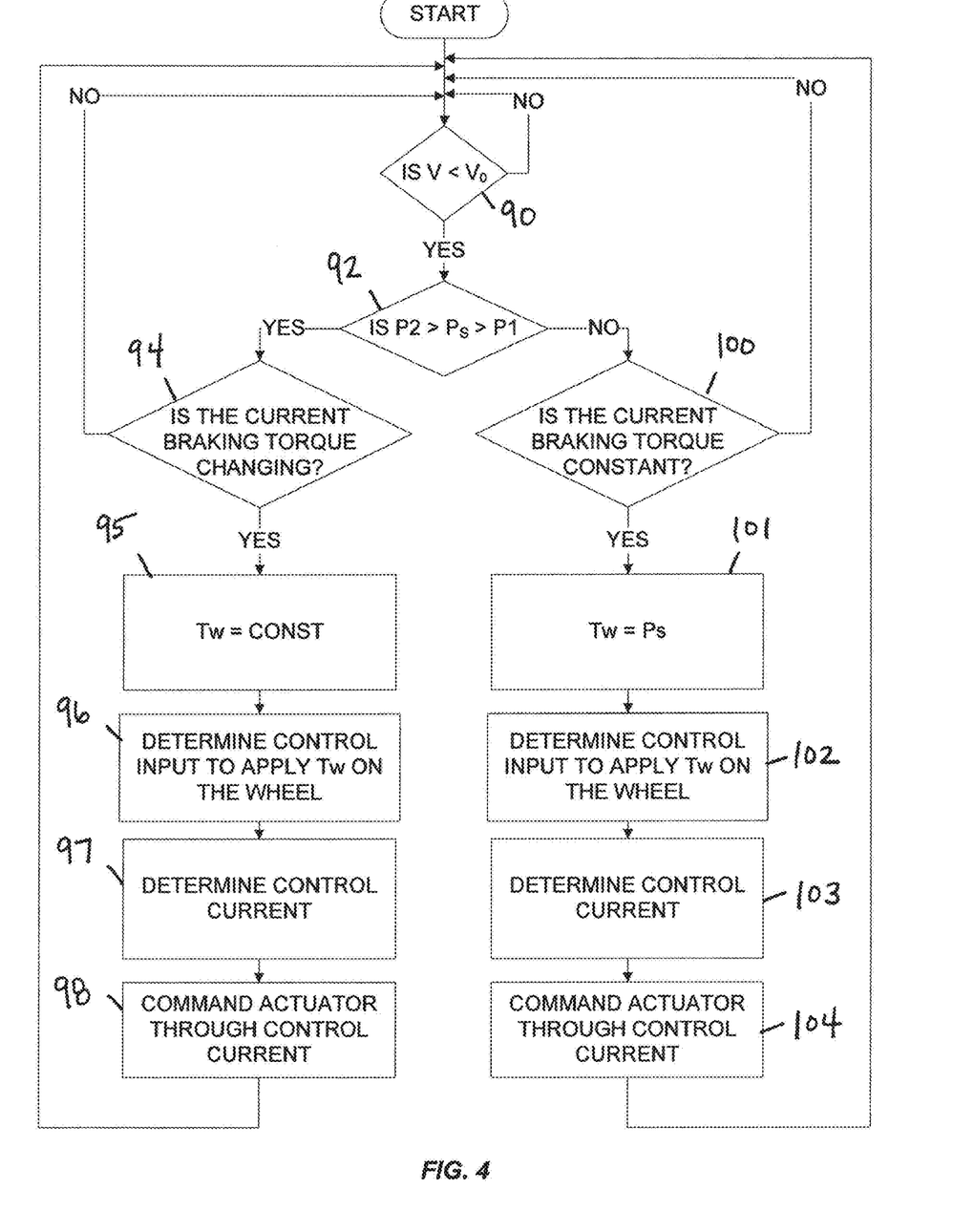
FIG. 4 illustrates a brake noise reduction method according to one embodiment of the invention.

FIG. 4 illustrates a brake noise reduction method performed by the BNR module 68. The method illustrated in FIG. 4 represents a "generic" brake noise reduction method that can be applied to different types of brake systems, including a mechanical and electrical brake system. The method starts by determining if the vehicle 10 is traveling at a "low" speed (step 90), such as a speed ("V") less than a velocity threshold ("$V_0$"). The velocity threshold depends on the characteristics of the vehicle 10 in which the system is used. However, in one embodiment the velocity threshold is approximately 5 kilometers per hour. If the vehicle is traveling at a "low" speed, the pressure sensor 16 is evaluated to determine whether the requested braking torque ("$P_S$") is within a predetermined range (e.g., between a first torque value ("P1") and a second torque value ("P2")) (step 92). As described above, the pressure sensor 16 senses the requested braking torque based on the amount of pressure applied by the vehicle operator to the brake pedal 34. The predetermined range varies based on the characteristics of the vehicle 10, but in one embodiment is approximately 2 bar to 8 bar.

If the requested braking torque is within the predetermined range (step 92), the BNR module 68 "holds" the current braking pressure or torque applied to at least one wheel 32 to reduce brake noise (steps 94-99). To "hold" the current braking torque applied to the at least one wheel 32, the BNR module 68 instructs at least one actuator 80 to set the braking torque ("$T_w$") applied by its associated brake assembly 30 to the currently applied braking torque (i.e., the brake torque from the previous cycle ("CONST")). By maintaining the current braking torque, the actuator 80 is instructed to ignore the requested braking torque intended by the vehicle operator in an attempt to reduce or prevent brake noise.

As shown in FIG. 4, to "hold" the current braking torque applied to at least one wheel 32, the BNR module 68 first determines if the current braking torque has already been held (step 94). In some embodiments, the BNR module 68 does this by determining if the current braking torque applied to at least one wheel is changing. If the current braking torque is changing, then it is has not already been held. Therefore, the BNR module 68 "holds" the current braking torque (step 95). As shown in FIG. 4, the BNR module 68 "holds" the current braking torque by determining a control input needed to hold the currently applied braking torque (step 96).

In some embodiments, the control input is the total torque ("T") needed at the motor shaft to maintain the current braking torque, which is the sum of the current braking torque ("CONST") and the motor torque ("$T_m$"). The motor torque can be calculated using the following formula:

$$T_m = J_m \ddot{q} + k_m \dot{q}$$

Where $\dot{q}$ is the first derivative of the motor rotation speed, $\ddot{q}$ is the second derivative of the motor rotation speed, $J_m$ is the motor inertia, and $k_m$ is the motor friction coefficient. After the motor torque is determined, the BNR module 68 determines the total torque ("T") by adding the motor torque ("$T_m$") and the current braking torque ("CONST"). In some embodiments, the BNR module 68 only calculates the control input after it initially holds the braking torque because the following control cycles just retain the same actuation command.

As shown in FIG. 4, after the BNR module 68 determines the control input (step 96), the module 68 determines or transfers the control input to a control current (step 97). In some embodiments, the control input, which is the total torque ("T"), is proportional to the control current (i.e., the armature current $i_a$) as shown in the following formula.

$$T = k_a * i_a$$

Where $k_a$ is a constant. Therefore, the required torque applied by the braking assembly 30 is controlled using the armature current, which is a standard motor control mechanism. In some embodiments, the armature current is controlled by a current controller that is implemented in hardware, software, or a combination thereof After the control current is determined, the BNR module 68 sends a command to the actuator 80 based on the control current (step 98). In this embodiment, the command is the control current directly. In another embodiment described below with respect to FIG. 5, the command is the control current transformed into a PWM signal.

As shown in FIG. 4, while the vehicle is traveling at a "low" speed and the vehicle operator is requesting a braking torque within the predetermined range, the BNR module 68 holds the current braking torque applied to at least one wheel 32 and ignores the operator's requested braking torque. However, once the requested braking torque falls outside of the predetermined range (step 92 is "NO"), the BNR module 68 "releases" the current braking torque (if it was previously held) and instructs the actuator to apply the requested braking torque to the at least one wheel 32 (steps 100-104).

In particular, at step 100, the BNR module 68 determines whether the actuator 80 is holding the current braking torque applied to the at least one wheel 32. If so, the BNR module 68 "releases" the braking torque and instructs the actuator 80 to apply the requested braking torque ("$P_S$") (step 101).

As shown in FIG. 4, the BNR module 68 "releases" the current braking torque by determining a control input needed to apply the requested braking torque (step 102). As described above, the control input is based on the total torque ("T") needed at the motor shaft to apply the requested braking torque, which is the sum of the requested braking torque ("$P_S$") and the motor torque ("$T_m$"). Therefore, the BNR module 68 determines the motor torque ("$T_m$") using the above formula and determines the total torque ("T") by adding the motor torque ("$T_m$") to the requested braking torque ("$P_S$").

After the BNR module 68 determines the control input (step 102), the module 68 determines or transfers the control input to a control current, using the formula described above (step 103), and sends a command to the actuator 80 based on the control current (step 104). Again, in this embodiment, the command is the control current directly, but, in other embodiments (see FIG. 5), the command is a PWM signal based on the control current.

Figure 5:
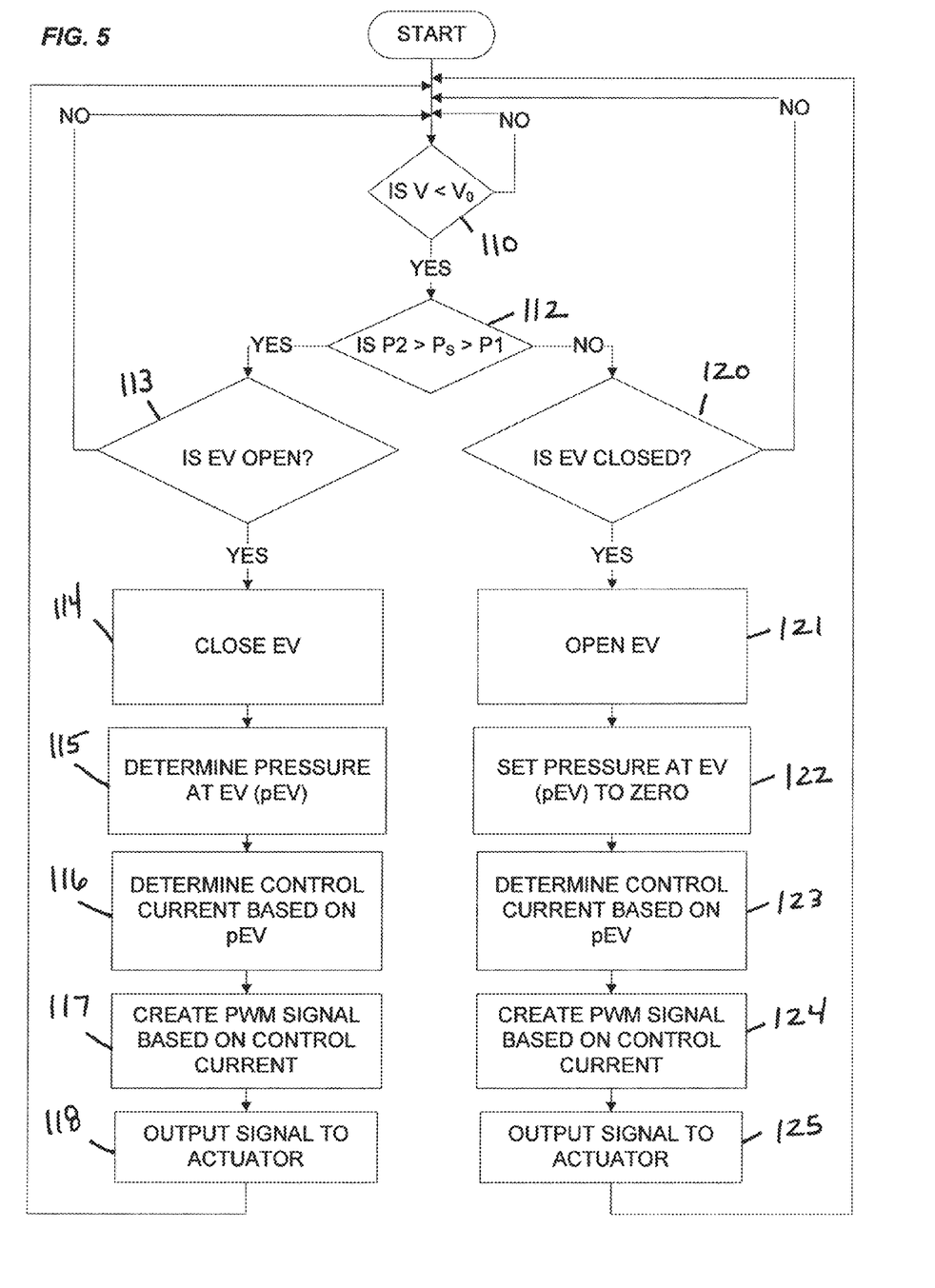
FIG. 5 illustrates the brake noise reduction method of FIG. 4 applied to a hydraulic brake system according to one embodiment of the invention.

FIG. 5 illustrates the "generic" brake noise reduction method of FIG. 4 applied to a hydraulic brake system according to one embodiment of the invention. Similar to the method illustrated in FIG. 4, the method of FIG. 5 starts by determining if the vehicle 10 is traveling at a "low" speed (step 110) and if the requested braking torque is within a predetermined range (step 112). If both step 110 and step 112 are satisfied, the BNR module 68 "holds" the current braking pressure or torque applied to at least one wheel 32 to reduce brake noise (steps 113-118).

To "hold" the current braking torque applied to at least one wheel 32, the BNR module 68 first determines if the current braking torque has already been held (step 113). As shown in FIG. 5, in a hydraulic brake system, the BNR module 68 performs step 113 by determining if an inlet valve 50 associated with the at least one wheel 32 is open. The BNR module 68 obtains this information from the actuator 80 or other components of the system 12, such as a position sensor or pressure sensor associated with the inlet valve 50. If an inlet valve 50 is open, additional brake fluid is entering the associated brake assembly 30, and, consequently, additional braking torque or pressure is being applied to the wheel 32. Therefore, the braking torque applied by a brake assembly 30 is changing when its associated inlet valve 50 is open and is not changing when its associated inlet valve 50 is closed.

If the inlet valve 50 is open (step 113), the BNR module 68 closes the inlet valve 50 in order to "hold" the current braking torque applied to the at least one wheel (step 114). As shown in FIG. 5, the BNR module 68 closes the inlet valve 50 by determining a pressure at the inlet valve 50 ("pEV") (step 115).

In some embodiments, the BNR module 68 determines the pressure at the inlet valve 50 (step 115) by obtaining the value of the current braking pressure applied to the at least one wheel (e.g., from the actuator 80 or a pressure sensor associated with the brake assembly 30) and subtracting that value from the requested braking torque. After the BNR module 68 determines the pressure at the inlet valve 50, the BNR module 68 determines a control current based on the pressure at the inlet valve 50 (step 116). In some embodiments, the BNR module 68 determines the control current using the following formula.

$$i = k_p * p_{EV}$$

Where $k_p$ is a constant.

After the BNR module 68 determines the control current, the BNR module 68 creates a PWM signal based on the determined control current (step 117) and outputs the PWM signal to the actuator 80 (step 118). In other embodiments, the BNR module 68 commands the actuator 80 by sending the control current directly, rather than generating and sending a PWM signal. For example, the PWM signal may be used to control electromagnetic valves (e.g., a pressure control valve designed as a seat valve driven by an electromagnet). The PWM signal is created by an electronic device which triggers the electromagnetic valve. The creation of PWM signals is not described in detail herein but is generally disclosed in U.S. Published Applications 2004/0225429 and 2001/0028195.

As shown in FIG. 5, while the vehicle is traveling at a "low" speed and the vehicle operator is requesting a braking torque within the predetermined range, the BNR module 68 holds the current braking torque applied to at least one wheel 32 and ignores the operator's requested braking torque. However, once the requested braking torque falls outside of the predetermined range (step 112 is "NO"), the BNR module 68 "releases" the current braking torque (if it was previously held) and instructs the actuator 80 to apply the requested braking torque to the at least one wheel 32 (steps 120-125).

In particular, at step 120, the BNR module 68 determines whether the actuator 80 is holding the current braking torque applied to the at least one wheel 32. As described above, in a hydraulic brake system, the BNR module 68 performs this step by determining whether an inlet valve 50 associated with the at least one wheel 32 is closed. If the inlet valve 50 is closed (step 120), the BNR module 68 opens the valve 50 to "release" the current braking torque applied to the at least one wheel and instructs the actuator 80 to apply the requested braking torque (step 121).

As shown in FIG. 5, the BNR module 68 opens the inlet valve 50 by setting the pressure at the inlet valve 50 to zero, which releases the brake fluid through the inlet valve 50 to the brake assembly 30 for braking the wheel 32 (step 121). The BNR module 68 then determines a control current using the formula provided above (step 123). After the BNR module 68 determines the control current, the BNR module 68 creates a PWM signal based on the determined control current (step 124) and outputs the PWM signal to the actuator 80 (step 125).

In some embodiments, the BNR module 68 only controls the brake assemblies 30 of particular wheels 32 of the vehicle 10. For example, the BNR module 68 may only control the brake assemblies 30 of the front wheels 32 or only control the brake assemblies 30 of the back wheels 32. The BNR module 68 may also be configured to vary the brake assemblies 32 it controls based on various vehicle conditions or operations or based on user input.

In addition, the BNR module 68 and the vehicle control module 70 can be combined and distributed in one or more modules. For example, the BNR module 68 can be combined with the vehicle control module 70 within a single module. The input/output interface 60 of the ECU 14 may also receive information from the pressure sensor 16 and store the information to the RAM 64 and the ECU may access the information from the RAM 64. Furthermore, although not shown in FIGS. 1 and 3, the ECU 14 may be configured to receive information from additional sensors, such as a wheel speed sensors, a yaw rate sensor, a steering sensor, a pitch sensor, a roll sensor, a longitudinal acceleration sensor, a lateral acceleration sensor, and other sensors that provide information used in ABS functionality or ESC functionality. Furtherstill, the ECU 14 may be configured to output other signals to the actuator 80 (e.g., related to ABS or ESC functionality) and may be configured to output other signals to other components, such as other controllers, warning lights or tell-tales in the vehicle 10, and other components of the braking system 20.

Furthermore, in some embodiments, the BNR module 68 accesses one or more look-up tables to determine the control input (steps 96 and 102 of FIG. 4), the control current (steps 97 and 103 of FIG. 4 and steps 116 and 123 of FIG. 5), and/or the pressure over the inlet valve 50 (step 115 of FIG. 5) rather than dynamically applying the formulas described above. For example, the BNR module 68 may determine a control current by accessing a look-up table that lists pairs of total torques and control currents and/or pairs of pressure values at the inlet valve 50 and control currents.

Thus, the invention provides, among other things, electronic control units and methods for reducing brake noise when a vehicle is traveling at a low speed.

What is claimed is:

1. A method for reducing brake noise in a vehicle, the method executed by a brake control system including an electronic control unit and an actuator that controls a brake assembly that applies a braking torque to a wheel of the vehicle, the method comprising:
   determining, with the electronic control unit, if a current velocity of the vehicle is less than a velocity threshold;
   determining, with the electronic control unit, if a requested braking torque is between a first torque threshold and a second torque threshold;
   determining, with the electronic control unit, if the current braking torque applied to the wheel by the brake is changing;
   if the current velocity of the vehicle is less than the velocity threshold, the requested braking torque is between the first torque threshold and the second torque threshold, and the current braking torque applied to the wheel by the brake assembly is changing:
      determining, with the electronic control unit, a current braking torque applied to the wheel by the brake assembly, and
      outputting, with the electronic control unit, a first signal to the actuator instructing the actuator to control the brake assembly to continue to apply the current braking torque to the wheel; and
   if the current velocity of the vehicle is less than the velocity threshold, the requested braking torque is not between the first torque threshold and the second torque threshold, and the current braking torque applied to the wheel by the brake assembly is not changing:
      outputting, with the electronic control unit, a second signal to the actuator instructing the actuator to control the brake assembly to apply the requested braking torque to the wheel.

2. The method of claim 1, further comprising receiving, with the electronic control unit, the requested braking torque from a pressure sensor.

3. The method of claim 1, wherein outputting, with the electronic control unit, a first signal to the actuator includes determining a motor output torque based on the current braking torque, determining a control current based on the motor output torque, creating a pulse-width-modulated signal based on the control current, and outputting the pulse-width-modulated signal to the actuator.

4. The method of claim 1, wherein outputting, with the electronic control unit, a second signal to the actuator includes determining a motor output torque based on the requested braking torque, determining a control current based on the motor output torque, creating a pulse-width-modulated signal based on the control current, and outputting the pulse-width-modulated signal to the actuator.

5. The method of claim 1, wherein determining, with the electronic control unit, if the current braking torque applied to the wheel by the brake is changing includes determining if an inlet valve associated with the brake assembly is open.

6. The method of claim 5, wherein outputting, with the electronic control unit, a first signal to the actuator includes outputting a first signal to the actuator instructing the actuator to close the inlet valve.

7. The method of claim 6, wherein outputting, with the electronic control unit, a second signal to the actuator includes outputting a second signal to the actuator instructing the actuator to open the inlet valve.

8. An electronic control unit for reducing brake noise comprising:
an electronic processing unit; and
a brake noise reduction module executed by the electronic processing unit that:
determines if a current velocity of the vehicle is less than a velocity threshold,
determines if a requested braking torque is between a first torque threshold and a second torque threshold,
determines if current braking torque applied to a wheel by a brake assembly is changing,
determines a current braking torque applied to the wheel by the brake assembly and outputs a first signal to an actuator instructing the actuator to control the brake to continue to apply the current braking torque to the wheel if the current velocity of the vehicle is less than the velocity threshold, the requested braking torque is between the first torque threshold and the second torque threshold, and the braking torque applied to the wheel by the brake assembly is changing, and
outputs a second signal to the actuator instructing the actuator to control the brake assembly to apply the requested braking torque to the wheel if the current velocity of the vehicle is less than the velocity threshold, the requested braking torque is not between the first torque threshold and the second torque threshold, and the braking torque applied to the wheel by the brake assembly is not changing.

9. The system of claim 8, wherein the controller further includes a vehicle control module executed by the electronic control unit.

10. The system of claim 9, wherein the vehicle control module performs anti-lock braking functionality.

11. The system of claim 9, wherein the vehicle control module performs electronic stability control functionality.

12. The system of claim 8, wherein the brake noise reduction module outputs the first signal and the second signal to an actuator that includes an electrical actuator that controls an electromechanical brake assembly that applies a braking torque to a wheel of the vehicle.

13. The system of claim 8, wherein the brake noise reduction module outputs the first signal and the second signal to an actuator that includes a hydraulic control unit that controls an inlet valve for a hydraulic brake assembly that applies a braking torque to a wheel of the vehicle.

14. The system of claim 8, wherein the brake noise reduction module outputs the first signal and the second signal to an actuator that controls a brake assembly that applies a braking torque to at least one of a left rear wheel and a right rear wheel of the vehicle.

15. The system of claim 8, wherein the brake noise reduction module outputs the first signal by determining a motor output torque based on the current braking torque, determining a control current based on the motor output torque, creating a pulse-width-modulated signal based on the control current, and outputting the pulse-width-modulated signal to the actuator.

16. The system of claim 8, wherein the brake noise reduction module outputs the second signal by determining a motor output torque based on the requested braking torque, determining a control current based on the motor output torque, creating a pulse-width-modulated signal based on the control current, and outputting the pulse-width-modulated signal to the actuator.

17. The system of claim 8, wherein the brake noise reduction module determines if the current braking torque applied to the wheel by the brake assembly is changing by determining if an inlet valve associated with the brake assembly is open.

18. The system of claim 17, wherein the first signal instructs the actuator to close the inlet valve.

19. The system of claim 18, wherein the second signal instructs the actuator to open the inlet valve.

* * * * *